United States Patent [19]
Woodring

[11] 3,853,285
[45] Dec. 10, 1974

[54] RETRACTABLE CABLE DEVICE
[76] Inventor: Horace Leo Woodring, 2419 W. Oklahoma Pl., Tulsa, Okla. 74127
[22] Filed: Mar. 3, 1973
[21] Appl. No.: 346,446

[52] U.S. Cl. .......................................... 242/107.11
[51] Int. Cl. ............................................ B65h 75/48
[58] Field of Search ....... 242/107.1, 107.11–107.15, 242/107.3, 107.4, 107.6, 107.7, 100.1, 99; 191/12.2 R, 12.4

[56] References Cited
UNITED STATES PATENTS

| | | | |
|---|---|---|---|
| 999,641 | 8/1911 | Fuerst | 242/99 |
| 1,946,778 | 2/1934 | Cline | 242/107.1 |
| 2,052,341 | 8/1936 | Douglass | 242/107.11 |
| 2,392,052 | 1/1946 | McAuliffe | 242/107.6 |
| 2,526,256 | 10/1950 | Mihara | 242/107.6 |
| 2,637,109 | 5/1953 | Willis | 242/107.11 |
| 2,678,779 | 5/1954 | Bellmer | 242/107.1 |

Primary Examiner—Edward J. McCarthy
Attorney, Agent, or Firm—Robert E. Massa

[57] ABSTRACT

A retractable cable device comprises a cable, as a booster cable for a battery, wound around a spring-loaded spool positioned within a container in a manner that two ends of the cable are accessible at independent exits of the container. The cable is wound around the spool in a double manner, that is, the cable is first looped and the loop is secured to the spool with the cable then being wound doubly around the spool so that each end thereof exits from the container at a different location. The spool is spring biased to a wound position of the cable and stop means are provided so that the spool may be stopped at any chosen intermediate position between a fully wound condition and an unwound condition. In use for a battery booster cable, a cable providing two independent circuits is employed and the container includes storage means for the typical battery clamps.

4 Claims, 5 Drawing Figures

RETRACTABLE CABLE DEVICE

BACKGROUND OF THE INVENTION

This invention relates to cable devices, and more particularly, this invention relates to self-storing cable devices having means to retract cable components of those devices from an extended position.

Cable devices, known generally as "booster cables," for use in supplying power to the battery of an automobile from the battery of an automobile in which the engine is running, have long been employed. The specific purpose of these cable devices is to obtain sufficient electrical power from one automobile in which the engine is running to the starting motor of another automobile in which the battery is in a run-down or dead condition. In the simplest and most common form, these cable devices simply comprise a pair of heavy cables in which each of the individual cables has some form of clamp or attachment means at each end so that the proper battery terminals of each automobile may be connected. Generally, the person using such cable devices carries them in his automobile all the time, usually in the trunk. The individual cables are usually ten to fifteen feet long and invariably present an annoying storage problem since the cables are not easily compacted into a neat and orderly arrangement either by winding into a series of loops or winding into a ball or simply by being compacted into a random, unwound package. Furthermore, in use, the individual cables are necessarily extended to their full length before being used regardless of the distance between the two batteries to be connected.

There have been attempts made to design cable devices for various purposes in which the cable or cord may be used or stored in a neat and orderly manner. Some of these devices are described in the following U.S. Pat. Nos. 906,696, issued Dec. 15, 1908, to Emigh; No. 1,253,415, issued Jan. 15, 1918, to Nesbitt; No. 1,658,694, issued Feb. 7, 1928, to Sturge; and No. 2,052,341, issued Aug. 25, 1936, to Douglass.

SUMMARY OF THE INVENTION

Therefore, the primary object of this invention is to provide a retractable cable device which is inexpensive, easy to manufacture, and simple to use.

Still another object of this invention is to provide a retractable cable device which is capable of maintaining the cable components of the device in a neat and orderly condition both during use of the device and during its storage.

Still another object of this invention is to provide a retractable cable device in which the cable component of the device is protected during storage of the cable within the device.

These and other objects of the invention will become apparent from the accompanying drawings which describe the invention as a retractable cable device comprising a cable container, a spool for a cable mounted in said container, spring means biasing the spool to a first condition, stop means to operate cooperatively with the spool to hold the spool at a chosen position, and a cable wound on the spool in a manner that two ends of the cable are accessible at a perimeter of the spool. This invention provides the user with a cable device, such as a booster cable for an automobile battery, which may be quickly and conveniently put into use, and which will maintain the cable in a neat condition during use and, subsequently, during storage.

DESCRIPTION OF THE PREFERRED EMBODIMENTS

Figure 1:
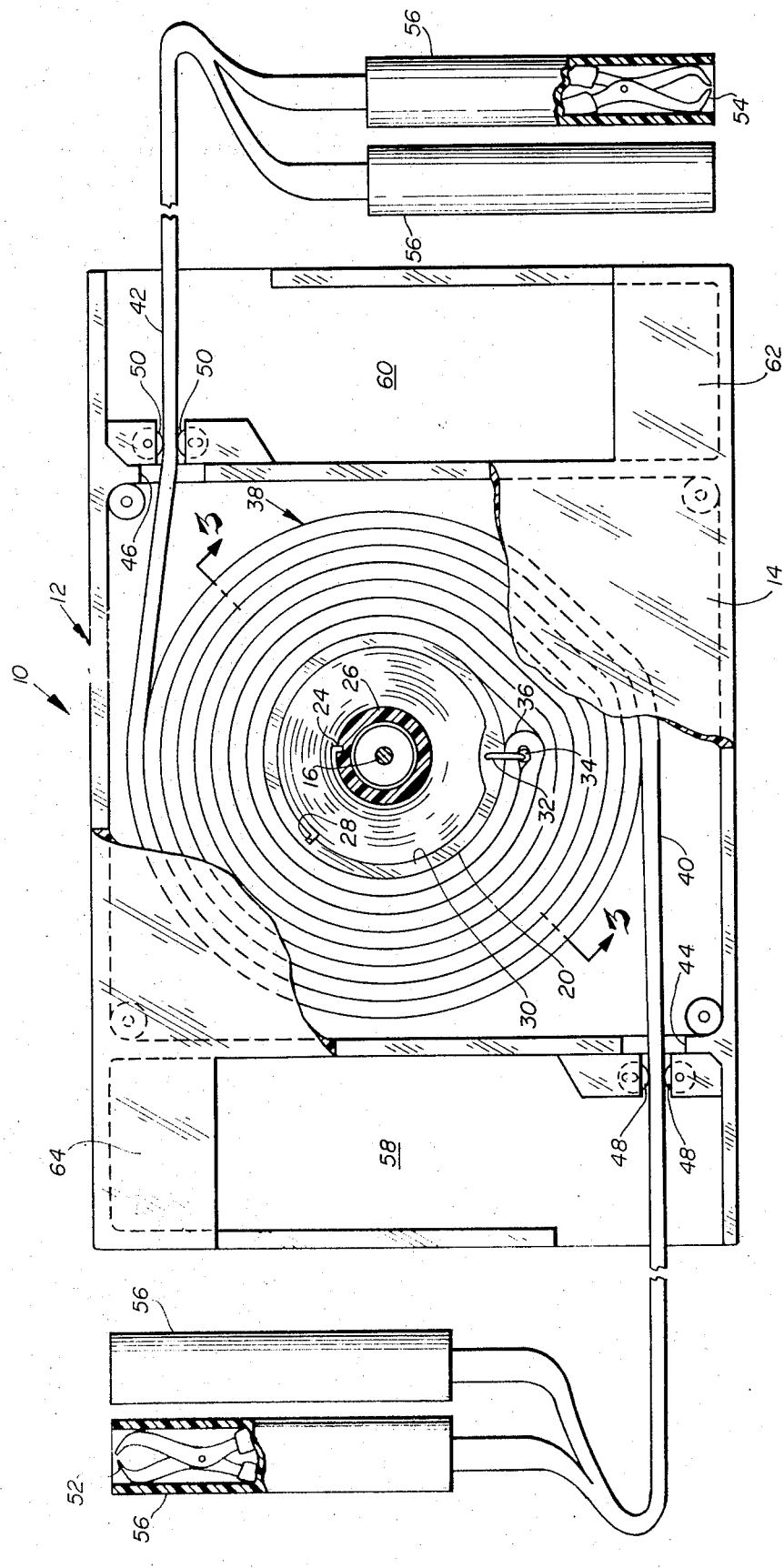
FIG. 1 is a top elevational view, partly cut away, and partly in section, showing a retractable cable device according to this invention, as it is prepatory to being put in use.
Figure 3:
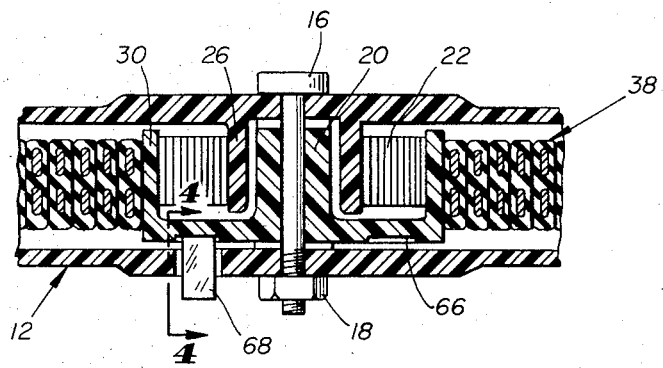
FIG. 3 is a sectional view of a retractable cable device according to this invention along the lines 3—3 of FIG. 1, showing a cable component of this device in a stored condition and showing a typical spring means employed in this invention.
Figure 4:
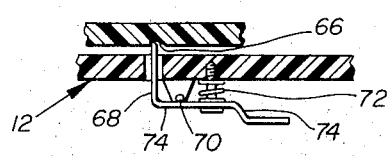
FIG. 4 is a sectional view along the lines 4—4 of FIG. 3 showing one manner of providing a stop means for a spool component of a cable device according to this device.

FIG. 1 describes a retractable cable device 10, generally, according to this invention, as having a container 12, generally, for maintaining the cable device in a neat condition during use or during storage and for protecting the cable device from abuse during storage. Container 12 is shown as having a cover 14 partially cut away to expose the operable components of the cable device. A bolt 16 held in position by a nut 18 (see FIG. 3) serves to hold portions of the container 12 together and to serve as an axis upon which a spool 20 may rotate. Spool 20 serves to enclose a coil spring 22 which has one end 24 secured to cylindrical wall 26 depending downwardly from cover 14. A second end 28 of coil spring 22 is secured to the interior of cylindrical wall 30 of spool 20. Thus, with coil spring 22 biased to a coiled condition, the securing of the ends of spring 22 to wall 26 and wall 30 serves to bias spool 20 to a first condition. Spool 20 will then resist rotation in a counter direction. Secured to cylindrical wall 30 is a clip 32 having thereon a bearing about which is looped and secured a loop 36 of a cable 38. In this manner, cable 38 may be doubly wound around spool 20 so that separate portions 40 and 42 are each accessible at a perimeter of a cable winding, and may exit from container 12 in opposite directions as through openings 44 and 46. Adjacent each opening 44 and 46 is a pair of guide rollers 48 and 50, respectively, to assist in keeping cable portions 40 and 42 in a neat and straight condition. For a typical booster cable for an automobile battery, cable 38 is a double cable, and at the end of cable portions 40 and 42, respectively, are a pair of clamps, such as typical alligator clamps 52 and 54. To act as insulation during use, clamps 52 and 54 may be provided with suitable insulating covers 56.

Figure 2:
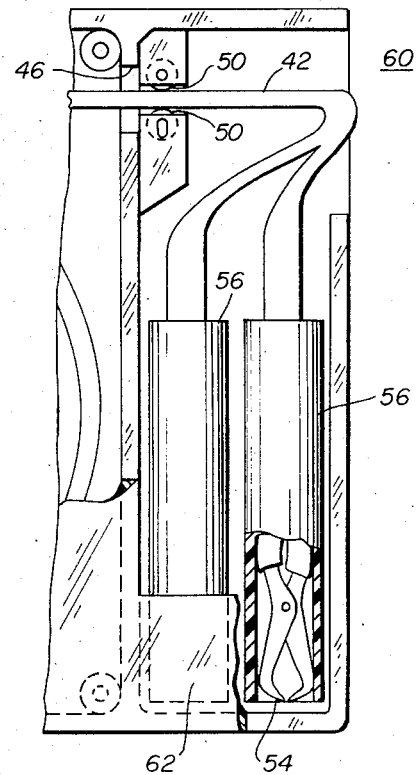
FIG. 2 is a partial top elevational view, partly cut away and partly in section, showing a portion of a cable device according to this invention as the device would be when in a storage condition.

FIG. 1 describes a typical retractable cable device as it is being prepared for use with clamps 52 removed from a storage compartment 58 in container 12, and clamps 54 removed from a similar storage compartment 60. In FIG. 2 clamps 54 are shown as they would be stored in compartment 60 with cable 38 being retracted and clamps 54 being held in position additionally by an extension 62 of cover 14. Similarly, clamps 52 may be held in position by an extension 64.

Figure 5:
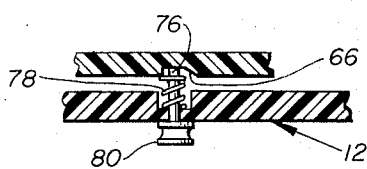
FIG. 5 is a sectional view similar to FIG. 4 describing an alternate embodiment of stop means for a cable device according to this invention.

On the bottom of spool 20 are a series of serrations 66 into which a spring loaded stop tongue 68 may be received. Tongue 68 is biased to a position against spool 20 by cooperation of pivot attachment means 70 and spring 72 operating with arm 74. Then, depressing arm 74 removes tongue 68 from serration 66 and spool 20 automatically returns, by action of coil spring 22 to a fully retracted position or an intermediate position as determined by further operation of the stop means. FIG. 5 describes an alternate embodiment for a stop means, and includes a pin 76 biased to a position against seration 66 by means of spring 78 attached to the bottom of container 12, and with the end of spring 78 also attached to pin 76. Then, in this embodiment, release of spool 20 is obtained by pulling outwardly on button 80 attached to the outer end of pin 76.

Since many different embodiments of this invention may be made without departing from the spirit and scope thereof, it is to be understood that the specific embodiments described in detail herein are not to be taken in a limiting sense, since the scope of the invention is best defined by the appended claims.

I claim:

1. A retractable cable device comprising:
   a cable container having two cable exits on opposite sides of the container,
   a spool for a cable mounted in said container,
   a cable looped around a clip attached to said spool in a manner that said cable is doubly wound upon itself around said spool with each of the two ends of the cable exiting from the container through a separate one of the exits,
   spring means mounted within the container biasing the spool to a wound condition of the cable, and
   stop means to operate cooperatively with the spool to hold the spool selectively at any chosen position between a fully wound condition of the cable and an unwound condition of the cable.

2. A retractable cable device as described in claim 1 wherein
   said spring means is comprised of coil spring means mounted coaxially with said spool.

3. A retractable cable device as described in claim 2, wherein
   said container includes roller guide means for said cable at an exit of said container.

4. A retractable cable device as described in claim 3, wherein
   said cable includes clamp means at an end thereof.

* * * * *